(12) United States Patent
Clarke et al.

(10) Patent No.: US 7,448,836 B2
(45) Date of Patent: Nov. 11, 2008

(54) LOAD CONTAINMENT NETTING SYSTEM

(75) Inventors: Brian S. Clarke, Hollywood, FL (US);
David S. Denny, West Haven, CT (US);
Edward T. Mehl, Windsor, CT (US)

(73) Assignee: D B Industries, Inc., Red Wing, MN (US)

( * ) Notice: Subject to any disclaimer, the term of this patent is extended or adjusted under 35 U.S.C. 154(b) by 59 days.

(21) Appl. No.: 11/343,262

(22) Filed: Jan. 30, 2006

(65) Prior Publication Data

US 2006/0255617 A1  Nov. 16, 2006

Related U.S. Application Data

(60) Provisional application No. 60/673,886, filed on Apr. 22, 2005.

(51) Int. Cl.
*B60P 7/08* (2006.01)
(52) U.S. Cl. ............................ 410/97; 410/118; 410/130
(58) Field of Classification Search .................. 410/97, 410/117, 118, 130; 296/24.4, 100.16; 87/5, 87/13
See application file for complete search history.

(56) References Cited

U.S. PATENT DOCUMENTS

| | | | |
|---|---|---|---|
| 2,705,461 A | 4/1955 | Campbell | |
| 3,099,313 A | 7/1963 | Peck et al. | |
| 3,173,539 A | 3/1965 | Looker | |
| 3,312,181 A | 4/1967 | Davidson | |
| 3,486,723 A | 12/1969 | Harrison | |
| 3,897,919 A | 8/1975 | Weingarten | |
| 3,961,585 A | 6/1976 | Brewer | |
| 4,026,218 A | 5/1977 | Prete, Jr. et al. | |
| 4,158,985 A | 6/1979 | Looker et al. | |
| 4,161,145 A | 7/1979 | Patterson, III et al. | |
| 4,256,424 A | 3/1981 | Knox et al. | |
| 4,462,493 A | 7/1984 | Nordstrom | |
| 4,708,549 A | 11/1987 | Jensen | |
| 4,892,210 A | 1/1990 | Kupersmit | |
| 4,964,771 A | 10/1990 | Callihan | |
| 5,085,326 A | 2/1992 | Russell et al. | |
| 5,108,237 A | 4/1992 | Zankich | |
| 5,121,958 A | 6/1992 | Goeden et al. | |
| 5,265,992 A | 11/1993 | Jensen | |
| 5,458,447 A | 10/1995 | Clason | |
| 5,573,359 A | 11/1996 | Moradians | |
| 5,692,793 A | 12/1997 | Wilson et al. | |
| 5,720,489 A | 2/1998 | Pierce et al. | |
| 5,772,371 A | 6/1998 | Ackerman | |
| 5,833,413 A | 11/1998 | Cornelius | |
| 5,855,291 A | 1/1999 | Ingle | |
| 5,865,495 A | 2/1999 | Nguyen | |
| 5,888,040 A | 3/1999 | Walsh et al. | |

(Continued)

OTHER PUBLICATIONS

"Notice of Voluntary Dismissal with Prejudice—D B Industries, d/b/a DBI/SALA, Plantiff, v. Edward T. Mehl and Brian S. Clarke, Defendants, Civil No. 06-cv-4247", 1 page (Feb. 16, 2007).

(Continued)

*Primary Examiner*—Stephen Gordon
(74) *Attorney, Agent, or Firm*—IPLM Group, P.A.

(57) ABSTRACT

A netting system is operatively connected to opposing walls of a compartment to contain a load within the compartment.

29 Claims, 1 Drawing Sheet

U.S. PATENT DOCUMENTS

| | | |
|---|---|---|
| D411,506 S | 6/1999 | Davis |
| 6,017,174 A | 1/2000 | Ross et al. |
| 6,024,402 A | 2/2000 | Wheatley |
| 6,068,085 A | 5/2000 | Denny et al. |
| 6,099,222 A | 8/2000 | Moore |
| 6,123,294 A | 9/2000 | Genovese |
| 6,152,664 A | 11/2000 | Dew et al. |
| 6,182,790 B1 | 2/2001 | Denny et al. |
| 6,244,803 B1 | 6/2001 | Parish et al. |
| 6,419,432 B1 | 7/2002 | Chou |
| 6,419,433 B1 | 7/2002 | Chou |
| 6,435,786 B1 | 8/2002 | Breckel et al. |
| 6,471,454 B1 | 10/2002 | Koller |
| 6,558,105 B2 | 5/2003 | Bjorklund et al. |
| 6,585,465 B1 | 7/2003 | Hammond et al. |
| 6,607,337 B1 | 8/2003 | Bullock |
| 6,609,621 B2 | 8/2003 | Denny et al. |
| 6,637,991 B2 | 10/2003 | Looker et al. |
| 6,935,819 B2 * | 8/2005 | Squyres ................. 410/104 |

OTHER PUBLICATIONS

Information from Related Litigation under MPEP § 2001.06(c): D B Industries, Inc. v. Edward T. Mehl and Brian S. Clarke, filed Oct. 20, 2006, case No. O:06-cv-04247, U.S. District Court, District of Minnesota, regarding Edward T. Mehl and Brian S. Clarke's duty to execute the necessary application documents for U.S. Appl. No. 11/343,262.

"E-Track Systems", Trailers Parts For Less—World's Largest Online Trailer, Hitch & Parts Store, http://www.trailer-parts-forless.com, 1 pg. (Printed Feb. 3, 2004).

"VersaTie Trac", Mac's Custom Tie Downs, http://www.macscustomtiedowns.com, 1 pg. (Printed Feb. 3, 2004).

* cited by examiner

LOAD CONTAINMENT NETTING SYSTEM

This application claims the benefit of U.S. Provisional Application No. 60/673,886, filed Apr. 22, 2005.

FIELD OF THE INVENTION

The present invention relates to a load containment netting system, and more specifically, to a load containment netting system for containment of a load within a compartment.

BACKGROUND OF THE INVENTION

Loading mixed loads into a compartment such as a trailer can be time consuming and can waste valuable driving time. Loads transported in trailers typically shift, and the loads may fall, especially if loaded incorrectly or if the load has been subjected to movement. Protecting personnel from falling cargo during loading, opening the trailer, and unloading is important for providing a safe work environment.

Many trailers include "A" tracks or "E" tracks, which are well known in the art, operatively connected to the interior surfaces of the trailers. It is desired to contain loads within a trailer with a netting system secured to the "A" tracks or the "E" tracks quickly and easily to reduce loading time, to reduce the risk of falling cargo, and to allow for easy access to the cargo.

SUMMARY OF THE INVENTION

In one aspect of the present invention, a netting system is operatively connected to sidewalls of a trailer to contain a load within the trailer.

In another aspect of the present invention, a load containment netting system for use with a compartment having opposing walls, at least one securing member operatively connected to each of the opposing walls, includes a net, a support member, and a connector. The net has opposing sides, a top, and a bottom. The support member is operatively connected to each side of the net. The connector is operatively connected to each support member and is configured and arranged to releasably connect to the at least one securing member operatively connected to each of the opposing walls. The support members and the net extending above the at least one securing member operatively connected to each of the opposing walls.

DETAILED DESCRIPTION OF A PREFERRED EMBODIMENT

Figure 1:
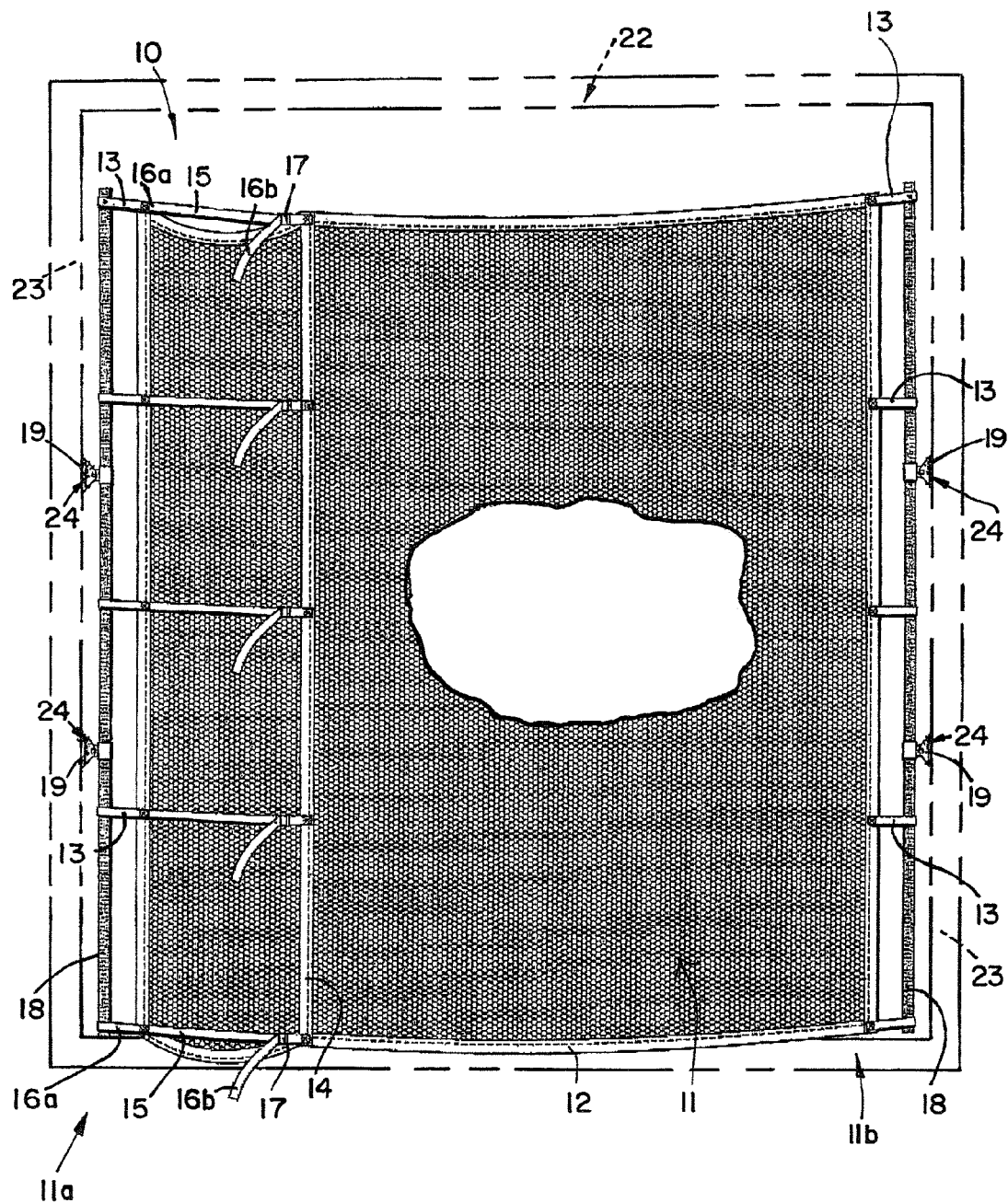
FIG. 1 is a front elevation view of a load containment netting system constructed according to the principles of the present invention.

A preferred embodiment load containment netting system constructed according to the principles of the present invention is designated by the number 10 in FIG. 1.

The netting system 10 is configured and arranged to operatively connect to a securing member 24 operatively connected to each sidewall 23 of a compartment such as a trailer 22. The securing member 24 is preferably an "A" track or an "E" track, each of which is well known in the art and is operatively connected to each sidewall 23 of the trailer 22 by means well known in the art.

The netting system 10 includes a net 11, a support member 18, and a clip member 19. The net 11 is preferably made of a synthetic, flame retardant mesh material. The net 11 includes an edge 12, which reinforces the perimeter of the net 11. A plurality of loops 13 are operatively connected to at least opposing sides 11a and 11b of the net 11 proximate the edge 12. Preferably at least two loops 13, and more preferably at least three loops 13, should be used. A seam 14 is preferably located parallel to the opposing sides 11a and 11b of the net 11 and preferably approximately 12 inches from side 11a.

A strap member 15 includes a first end 16a and a second end 16b. The first end 16a of the strap member 15 is operatively connected to the edge 12 of side 11a proximate each loop 13. An adjusting member 17 is operatively connected to the seam 14 at a corresponding location on the seam 14 as the first end 16a of the strap member 15 on the edge 12 of side 11a. The adjusting member 17 is configured and arranged to adjustably and releasably secure the second end 16b of the corresponding strap member 15 thereby adjusting the width of the net 11 as the length of the strap member 15 is adjusted. The strap members 15 gather any excess netting between the side 11a and the seam 14 to accommodate different widths of trailers and are tensioning devices to ensure that the net 11 is taut to secure the load within the trailer. Typically, the width of a trailer may vary from 96 to 102 inches, and the net 11 is adjustable to accommodate these varying widths by adjusting the length of the strap members 15 with the adjusting member 17. Further, depending upon the load, the net 11 may be adjusted to accommodate different types of loads. The netting may also be installed at an angle within the trailer to accommodate different types of loads, and each strap member 15 may be adjusted differently to accommodate different types of loads. Further, the net 11 may wrap around the side of the load to secure and to help prevent shifting of the load within the trailer.

It is recognized that the distance of seam 14 from side 11a may be varied. It is also recognized that seam 14 may be located more proximate side 11b and that strap members 15 may be located on side 11b rather than on side 11a.

The plurality of loops 13 are configured and arranged to loop around a support member 18, which is preferably a tubular member, proximate each side 11a and 11b of the net 11. Preferably, the loops 13 proximate each of the four corners of the net 11 are fastened to the support member 18 with screws or other suitable fasteners so that the net 11 does not slide off of the support member 18. The support member 18 includes at least two clip members 19, which are well known in the art. The clip members 19 are configured and arranged to slidably move up and down the length of the support member 18 and are pivotable to easily and quickly align with the securing members 24 of the sidewalls 23 or the trailer 22. The clip members 19 are configured and arranged to simply snap into the securing members 24 of the sidewalls 23 of the trailer 22 as is well known in the art. It is also recognized that loops 13 may be operatively connected to the edge 12 of the net 11 proximate the top and the bottom of the net 11 to loop around a support member 19 to secure the top and the bottom of the net 11 to the top and the bottom of the trailer 22.

After the trailer has been loaded with cargo, the netting system 10 is easily and quickly installed. To install the netting system, the clip members 19 operatively connected to the support members 18 are adjusted, if necessary, to align with the respective securing members 24 and snapped into the respective securing members 24. If there is slack in the net 11, the lengths of the strap members 15 are adjusted and shortened by pulling the ends 16b of the strap members 15 thereby pulling the strap members 15 through the adjusting members 17 and securing the strap members 15 with the adjusting members 17 to make the net 11 taut. The support members 18 provide support for the sides 11a and 11b of the net 11 and allow for the net 11 to extend upward above the height of the securing members 24.

The present invention allows for load containment up to approximately 1,100 pounds. The present invention also allows for safe and easy load separation, ensures load security, reduces destination product confusion, and allows for easy and quick installation.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A load containment netting system for use with a compartment having opposing walls, at least one securing member operatively connected to each of the opposing walls, each at least one securing member being located at a height, comprising:
   a) a net having opposing first and second sides, a top, and a bottom;
   b) an elongate support member operatively connected to each side of the net, each elongate support member being tubular; and
   c) a connector operatively connected to each elongate support member, each connector being configured and arranged to releasably connect to the at least one securing member operatively connected to each of the opposing walls, the elongate support members and the net extending above the height of each at least one securing member operatively connected to each of the opposing walls.

2. The load containment netting system of claim 1, further comprising a first loop operatively connected to the first side of the net proximate the top, a second loop operatively connected to the first side of the net proximate the bottom, a third loop operatively connected to the second side of the net proximate the top, and a fourth loop operatively connected to the second side of the net proximate the bottom, wherein the loops interconnect the net and the elongate support members.

3. The load containment netting system of claim 1, wherein the connectors are releasably connected to the at least one securing member operatively connected to each of the opposing walls at different positions within the compartment.

4. The load containment netting system of claim 1, wherein the net wraps around a load within the compartment to prevent the load from shifting within the compartment.

5. The load containment netting system of claim 1, wherein the elongate support members pivot relative to the connectors.

6. The load containment netting system of claim 1, wherein the connectors slide along a length of the elongate support members.

7. A load containment netting system for use with a compartment having opposing walls, at least one securing member operatively connected to each of the opposing walls, comprising:
   a) a net having opposing first and second sides, a top, and a bottom;
   b) an elongate support member operatively connected to each side of the net;
   c) a connector operatively connected to each elongate support member, each connector being configured and arranged to releasably connect to the at least one securing member operatively connected to each of the opposing walls, the elongate support members and the net extending above the at least one securing member operatively connected to each of the opposing walls;
   d) a reinforced portion operatively connected to the net a distance from the first side;
   e) a strap member including an intermediate portion interconnecting a first end and a second end, the first end being operatively connected to the net proximate the first side; and
   f) an adjusting member operatively connected to the reinforced portion, the second end of the strap member being threaded through the adjusting member, the adjusting member being configured and arranged to adjustably and releasably connect the intermediate portion of the strap member to the net proximate the reinforced portion to adjust the net to a desired width.

8. The load containment netting system of claim 7, wherein the reinforced portion is a seam in the net.

9. The load containment netting system of claim 1, wherein the connector is a first connector and a second connector configured and arranged to releasably connect to a first securing member and a second securing member operatively connected to each of the opposing walls, the elongate support members and the net extending above the first and second securing members.

10. A load containment netting system for use with a compartment having opposing walls, at least one securing member operatively connected to each of the opposing walls, comprising:
    a) a net having opposing first and second sides, a top, and a bottom, the first and second sides each having a length;
    b) an elongate support member operatively connected to each side of the net, the elongate support member extending along the length of each side and providing support for each side; and
    c) a connector slidably operatively connected to each elongate support member, each connector being adjustable along the respective elongate support member and pivotable relative to the respective elongate support member to correspond with the respective at least one securing member, each connector being configured and arranged to releasably connect to the at least one securing member operatively connected to each of the opposing walls, the elongate support members and the net extending above the at least one securing member operatively connected to each of the opposing walls.

11. The load containment netting system of claim 10, wherein the first and second sides include a plurality of loops configured and arranged to loop around the respective elongate support member.

12. The load containment netting system of claim 11, wherein the plurality of loops are secured to the respective elongate support member with fasteners.

13. The load containment netting system of claim 10, further comprising:
    a) a reinforced portion operatively connected to the net a distance from the first side;
    b) a strap member including an intermediate portion interconnecting a first end and a second end, the first end being operatively connected to the net proximate the first side; and
    c) an adjusting member operatively connected to the reinforced portion, the second end of the strap member being threaded through the adjusting member, the adjusting member being configured and arranged to adjustably and releasably connect the intermediate portion of the strap member to the net proximate the reinforced portion to adjust the net to a desired width.

14. The load containment netting system of claim 13, wherein the reinforced portion is a seam in the net.

15. The load containment netting system of claim 10, wherein the connector is a first connector and a second connector configured and arranged to releasably connect to a first securing member and a second securing member operatively connected to each of the opposing walls, the elongate support members and the net extending above the first and second securing members.

16. A load containment netting system for use with a compartment having opposing walls, a first securing member and a second securing member operatively connected to each of the opposing walls, comprising:
   a) a net having opposing first and second sides, a top, and a bottom, the first and second sides each having a length;
   b) an elongate support member operatively connected to each side of the net, the elongate support member extending along the length of each side and providing support for each side; and
   c) a first connector and a second connector slidably operatively connected to each elongate support member, the first and second connectors being adjustable along the respective elongate support members and pivotable relative to the respective elongate support members to correspond with the respective first and second securing members, the first and second connectors being configured and arranged to releasably connect to the respective first and second securing members operatively connected to each of the opposing walls, the elongate support members and the net extending above the first and second securing members operatively connected to each of the opposing walls.

17. The load containment netting system of claim 16, wherein the first and second sides include a plurality of loops configured and arranged to loop around the respective elongate support member.

18. The load containment netting system of claim 17, wherein the plurality of loops are secured to the respective elongate support member with fasteners.

19. The load containment netting system of claim 16, further comprising:
   a) a reinforced portion operatively connected to the net a distance from the first side;
   b) a strap member including an intermediate portion interconnecting a first end and a second end, the first end being operatively connected to the net proximate the first side; and
   c) an adjusting member operatively connected to the reinforced portion, the second end of the strap member being threaded through the adjusting member, the adjusting member being configured and arranged to adjustably and releasably connect the intermediate portion of the strap member to the net proximate the reinforced portion to adjust the net to a desired width.

20. The load containment netting system of claim 19, wherein the reinforced portion is a seam in the net.

21. The load containment netting system of claim 7, wherein the elongate support member is a tubular member.

22. The load containment netting system of claim 10, wherein the elongate support member is a tubular member.

23. The load containment netting system of claim 16, wherein the elongate support member is a tubular member.

24. A load containment netting system for use with a compartment having opposing walls, at least one securing member operatively connected to each of the opposing walls, comprising:
   a) a net having opposing first and second sides, a top, and a bottom;
   b) a tubular elongate support member operatively connected to each side of the net; and
   c) a connector operatively connected to each tubular elongate support member, each connector being configured and arranged to releasably connect to the at least one securing member operatively connected to each of the opposing walls, the tubular elongate support members and the net extending above the at least one securing member operatively connected to each of the opposing walls.

25. The load containment netting system of claim 24, wherein each of the at least one securing member is located at a height and the tubular elongate support members and the net extend above the height of each of the at least one securing member.

26. The load containment netting system of claim 24, wherein the tubular elongate support members pivot relative to the connectors.

27. The load containment netting system of claim 24, wherein the net wraps around a load within the compartment to prevent the load from shifting within the compartment.

28. The load containment netting system of claim 24, wherein the connectors slide along a length of the tubular elongate support members.

29. The load containment netting system of claim 24, wherein the connector is a first connector and a second connector configured and arranged to releasably connect to a first securing member and a second securing member operatively connected to each of the opposing walls, the tubular elongate support members and the net extending above the first and second securing members.

* * * * *